United States Patent

[11] 3,587,141

| [72] | Inventor | George M. Brown<br>St. Petersburg, Fla. |
|---|---|---|
| [21] | Appl. No. | 818,713 |
| [22] | Filed | Apr. 23, 1969 |
| [45] | Patented | June 28, 1971 |
| [73] | Assignee | Sauna International, Inc., Miami, Fla. |

[54] MULTI POINT RELEASABLE COUPLING
6 Claims, 8 Drawing Figs.

| [52] | U.S. Cl. | 24/205.17 |
|---|---|---|
| [51] | Int. Cl. | A44b 17/00 |
| [50] | Field of Search | 24/205.18, 205.17, 73.05 |

[56] References Cited
UNITED STATES PATENTS

| 1,177,927 | 4/1916 | Calthrop | 24/205.17UX |
|---|---|---|---|
| 2,003,205 | 5/1935 | Kuhlemann | 24/205.17X |
| 2,393,178 | 1/1946 | Manson | 24/205.17X |

FOREIGN PATENTS

| 727,600 | 11/1942 | Germany | 24/205.17 |
|---|---|---|---|
| 847,174 | 9/1960 | Great Britain | 24/205.17 |

*Primary Examiner*—Bernard A. Gelak
*Attorney*—Fidelman, Wolffe and Leitner

ABSTRACT: A multipoint releasable coupling including a plurality of male coupling members releasably engaged in a female coupling member. Each male coupling member is releasably locked between a sliding latch plunger and a latching tooth. All of the latching teeth are carried by a rotatable disc mounted on the female coupling member. A manually actuatable pivot lever is operatively coupled to the disc and is manually actuatable by a lifting motion to release it from a motion restraining position on said female coupling member. Subsequently, the lever arm is manually pivoted to rotate the disc and thereby remove the latching teeth from engagement with the male coupling members, thereby permitting simultaneous removal of the male coupling members from the female coupling member.

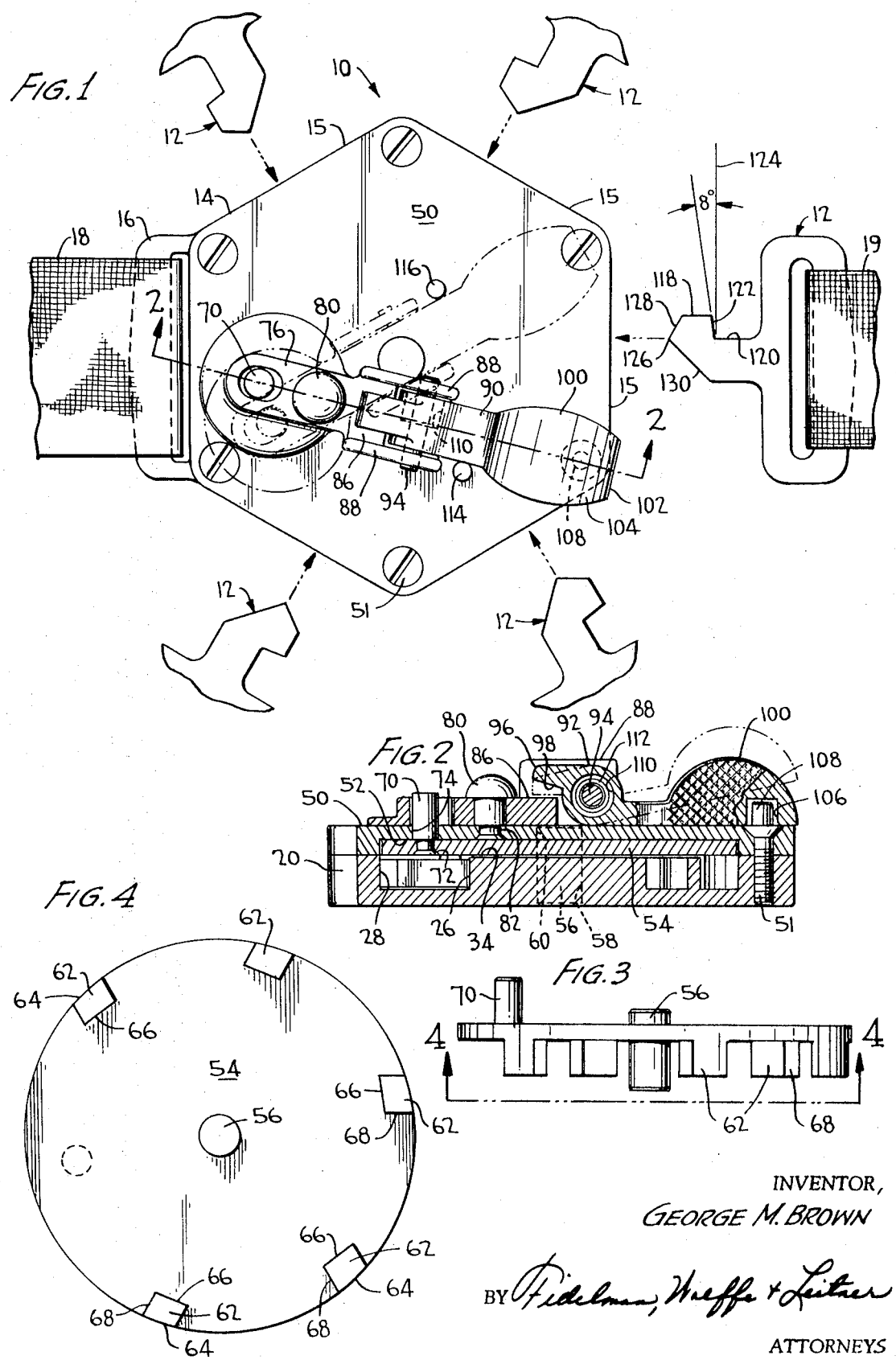

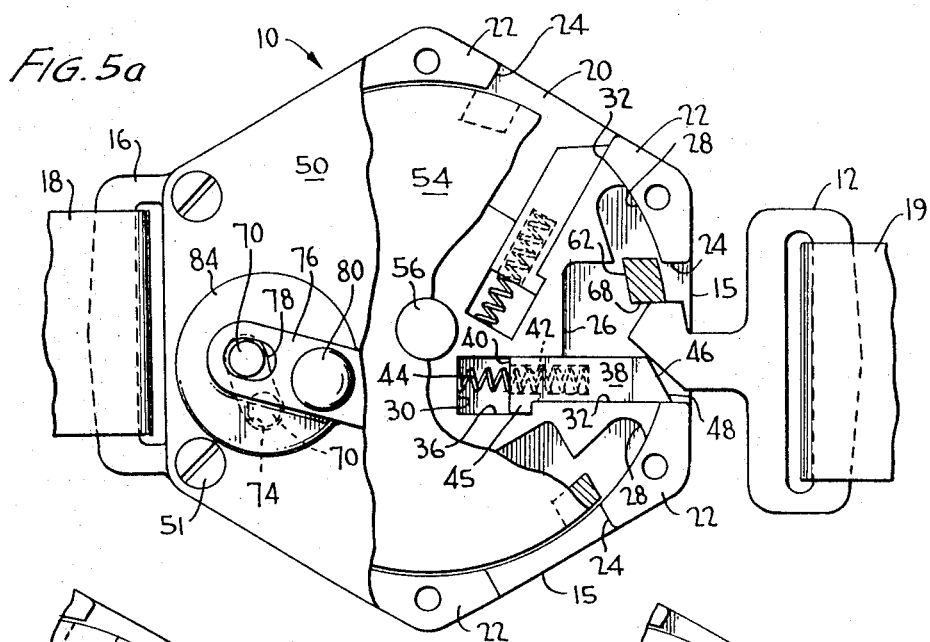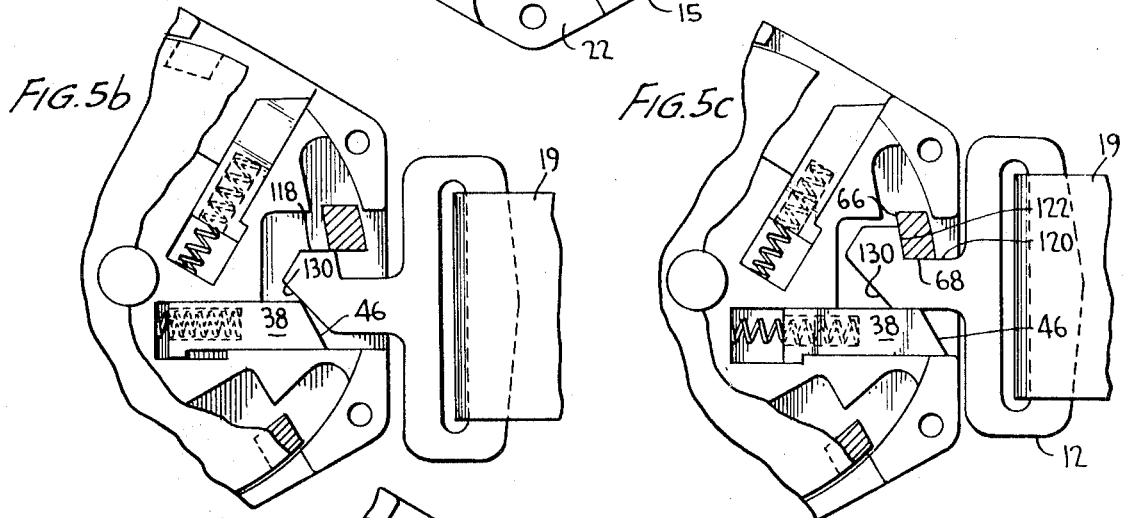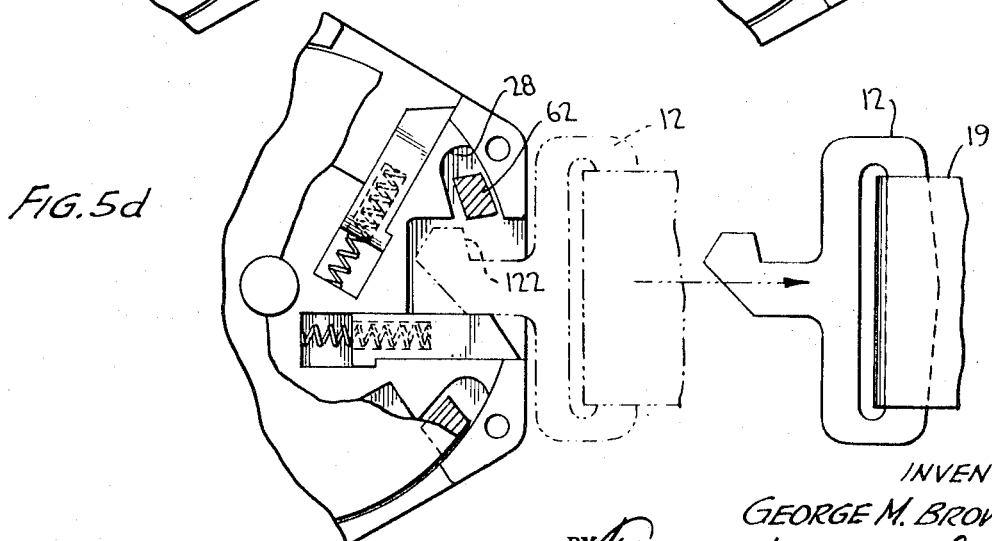

MULTI POINT RELEASABLE COUPLING

The present invention relates to a multipoint releasable coupling, and, more particularly, to a coupling member to which a plurality of male coupling members are releasably locked and manually simultaneously released. According to the invention, a plurality of male coupling members are manually inserted for locking engagement in a female coupling member. A rotatable disc is carried by the female coupling member and is provided with a plurality of projecting latching teeth. Associated with each of the latching teeth is a retractable latching plunger. The plunger initially is resiliently retractable to permit insertion of a male coupling member, and subsequently cooperates with a latching tooth to lockingly retain a male coupling member in said female coupling member. A manually actuatable lever arm is pivotably mounted on a cover plate of the female coupling member and is connected to the rotatable disc. Initially, the lever arm is retained in a motion restraining position on said cover plate to prevent its undesired motion. To simultaneously release the male coupling members, a user of the invention imparts a lifting motion to a portion of the lever arm to release it from its motion restraining position. Secondly, the user pivots the lever arm generally in a direction coplanar with that of the rotatable disc and generally orthogonal to the direction of the lifting motion. Accordingly, such pivotal motion of the lever arm rotates the disc, the circumferentially mounted projecting latching teeth thereby being purposely removed from locking engagement on said male coupling members. Thus, all of the male coupling members are simultaneously released from the female coupling member. A further feature of the invention resides in the advantage that the plurality of male coupling members may be coupled in opposed relationship to prevent introduction of twisting forces, permitting the present invention to be utilized in close proximity to a user's body without discomfort thereto.

Accordingly, it is an object of the present invention to provide a multi point releasable coupling wherein a plurality of male coupling members are lockingly engaged in a female coupling member and simultaneously manually released.

A further object of the present invention is to provide a releasable coupling wherein a release operation is manually performed by a two step operation by a user of the invention.

A further object of the invention is to provide a coupling wherein a plurality of latching and unlatching functions are performed by manual actuation of a single movable structural component.

Another object of the invention is to provide a multi point releasable coupling wherein a plurality of release functions are performed by a user of the invention without introduction of excessive friction forces or complex operations.

Yet another object of the invention is to provide multi point releasable coupling wherein an inadvertent coupling operation is prevented by motion restraining structural components.

Yet another object of the invention is to provide a multi point releasable coupling wherein an uncoupling function is performed by a positive manual pivotal actuation of a lever arm, such pivotal motion being positively limited to prevent over travel of the lever arm.

Other objects and many attendant advantages of the present invention will become apparent upon perusal of the following detailed description thereof taken in conjunction with the accompanying drawings wherein:

FIG. 1 is a planned view of a multipoint releasable coupling according to the invention, and further illustrating in phantom lines a secondary position for a manually actuable lever arm carried by a female coupling member;

FIG. 2 is a section generally along the line 2–2 of FIG. 1;

FIG. 3 is an enlarged elevation of a rotatable disc and associated latching teeth comprising a portion of the coupling according to the invention;

FIG. 4 is an enlarged view generally along the line 4–4 of FIG. 3, and;

FIGS. 5a, 5b, 5c and 5d are enlarged fragmentary plan views of the coupling illustrated in FIG. 1 with parts partially broken away and partially in section to illustrate sequentially the engagement and positive release of one of the male coupling members according to the invention.

With more particular reference to the drawings, there is illustrated in FIG. 1, a releasable coupling, generally illustrated at 10 according to the invention. The coupling includes a plurality of male coupling members 12 which are manually engaged in a single female coupling member 14 in the shape of a regular polyhedron, the marginal straight side margins or edges 15 of which are equal in number to the amount of male coupling members 12 to be secured in the female coupling member 14. As shown in the drawing, five releasable coupling members 12 are illustrated with a sixth fixed coupling member 16. Accordingly, the female coupling member 14 is provided with six straight marginal side edges. It is understood that any desired number of male coupling members 12 may be provided, whereby the female coupling member will be accordingly provided with an equal number of straight marginal side edges 15. The fixed coupling member 16 is in the form of a U-shaped flange and has fixedly secured thereto a looped end portion 18 of webbing. For example, the webbing 18 may comprise a belt adapted for encircling the body of a user and terminating in a second looped end portion 20 fixedly secured to one of the male coupling members 12. For example, the male coupling member carrying the second looped end portion 20 is adapted for insertion in the female coupling member 14 at a side directly opposite to that of the first looped end portion 18. Accordingly, the coupling member 16 and the directly opposed coupling member 12 will transmit forces from the opposed looped portions 18 and 20 of the belt directly across the female coupling member 14 without introduction of undesirable twisting forces thereacross. Accordingly, in the particular illustrated preferred embodiment of the invention, each of the coupling members 12 or 16 is associated with a directly opposed, oppositely inserted coupling member to insure that forces between the opposed coupling members are transmitted directly across the female coupling member 14 without introduction of twisting forces. Accordingly, the coupling member 10 is particularly adapted for use in close proximity to the body of a human or animal without introducing discomfort thereto.

With reference to FIGS. 1, 2 and 5 of the drawings, the female coupling member 14 is provided with a base plate 20 having, as particularly shown in FIG. 5a, a plurality of spaced upstanding sidewall portions 22 circumferentially spaced about the periphery of the regular polyhedron configurations of the plate 20 and disposed generally at the intersections of the straight peripheral side margins 15 thereof. Accordingly, each pair of spaced sidewalls 22 define therebetween a generally rectangular opening 24, centrally of each straight margin 15, for receiving a male connecting member 12. Accordingly, with reference to FIG. 5a, one of the male connecting members 12 which carries the looped portion 20 of the belt is shown received in one of the openings 24 located at a side directly opposite the fixed coupling member 16. For example, the coupling member 16 may be fabricated integrally or otherwise connected to in any well known manner to the base plate 20.

Each of the openings 24 communicates interiorly of the base plate 20 with an associated laterally extending, generally rectangular recess 26, as shown in FIG. 2, formed in the top portion of the base plate 20. The recess 26 is provided with a reduced width arcuate recess portion 28 the longitudinal axis of which extends in equal radially spaced relationship from the center of the regular polyhedron configuration of the base plate 20. Each of the rectangular recesses 26 is provided with an extended recess portion 30 of generally reduced rectangular cross section. Said recess portion 30 additionally extends inwardly from the rectangular recess 26 toward the center of the polyhedron configured base plate 20. Further, each of the recesses 30 is positioned generally perpendicular to a corresponding straight marginal portion of the polyhedron configured base plate. The rectangular recess 26 and the extended recess portion 30 share a common, recess defining sidewall 32, which sidewall is perpendicular to a corresponding straight margin 15 of the polyhedron configured base plate 20 and, more specifically, defines a sidewall of the recess 26 directly opposite the arcuate recess 28. Thus, by reference to both FIGS. 2 and 5a, each of the recesses 26, together with their respective corresponding reduced geometry recessed portion 28 and 30, are further defined as comprising a generally shallow cavity recessed in a top surface 34 of the base plate 20. Again with reference to FIG. 5, each of the extended recess portions 30 reduced further characterized by a generally widened channel portion 36 immediately adjacent to the terminal bottom of each of the recess portions 30. Slidably disposed in each of said recess portions 30 is an elongated keeper in the form of a sliding latch plunger 38. Each of the plungers 38 is generally rectangular in cross section and complementary in configuration to the cross section of the corresponding recess portion 30. A terminal end 40 of each plunger 38 is provided centrally thereof with a cylindrical cavity 42. A resilient coil spring 44 is carried substantially of its longitudinal length within each of the cavities 42. The ends of said spring abut against the bottom wall of the cavity 42 and the bottom wall of a corresponding recess portion 30. Adjacent to the terminal end 40 an extended leg portion 44 is provided on each plunger 38 for restricted sliding movement in the widened portion 36 of the recess portion 30. The opposite terminal end 46 of the plunger 28 is characterized by an inclined bearing surface 46 providing a tapered configuration, the projecting tip 48 of which slidably impinges along the sidewall 32.

With more particular reference to FIGS. 2, 3, 4 and 5, the bottom plate 20 is provided with a removable, overlying cover plate 50 complementary in configuration to that of the base plate 20. The cover plate 50 is removably attached to the base plate 20 by corner mounted machine screws 51. The cover plate is provided with an inverted shallow cylindrical recess 52. With reference to FIGS. 2, 3, 4 and 5, the recess 52 carries therein a circular disc locking plate 54. The disc 54 is provided centrally thereof with a reduced diameter cylindrical pivot post 56, a downwardly projecting protruding portion of which is received for rotation in a bore 58 provided centrally of the polyhedron configured bottom plate 20. An upwardly projecting portion of the pivot post 56 is received for rotation in a bore 60, provided centrally of the cover plate 50 and in alignment with the bore 58 of the base plate 20. As particularly shown in FIG. 2, the pivot post 56 is thus mounted for rotation centrally between the removable cover plate 50 and the base plate 20, and the disc 54 is thereby retained entirely within the confines of the inverted recess 52 of the cover plate 50. Additionally, as shown in FIGS. 2 and 5a, the disc 54 is of such diameter so as to mount it in overlying relationship with respect to the recesses 26 and the recess portions thereof 30 and 28. The outer circular periphery of the disc 54 thus corresponds in complementary configuration with the outer most arcuate sidewalls of each of the arcuate recess portions 28.

The disc 54 is provided with peripherally spaced, inverted, depending, projecting latching teeth 62, corresponding in number to the number of male connecting members 12 provided for engagement in the coupling member 14. Each of the teeth 62 is located adjacent to the outer circular periphery of the disc 54, which periphery provides a generally beveled arcuate outer surface 64 on each of the teeth. Each of the teeth 62 is provided with a bearing surface 66 generally parallel to the outer surface 64. Whereas, the surface 66 is generally parallel to the opposite surface 64 of each tooth, in practice, the surface 66 is machined to a planar, rather than arcuate bearing surface for a purpose to be hereinafter described.

With the cover plate and locking disc plate 54 in position overlying the base plate 20, each depending tooth 62 will be received in a corresponding one of the rectangular recesses 26 and in close proximity to a corresponding arcuate recess portion 28. Further, each tooth 62 will be aligned approximately on the arcuate longitudinal axis of said arcuate recess portion 28. This initial position of each tooth 62 is additionally in lateral spaced relationship with respect to a corresponding plunger 38. An additional side surface of each tooth 62 connects the corresponding side surfaces 64 and 66 thereof, and is so constructed and arranged to provide a flat bearing surface for a purpose to be hereinafter explained.

As particularly shown in FIG. 5a, with each tooth 62 in its initial position as shown and described, the bearing surface 68 is specifically fabricated to be perpendicular to the corresponding straight marginal side portion 15 of the regular polyhedron configured base plate 20.

With reference now being made more specifically to FIGS. 1, 2 and 3, the disc locking plate 54 is provided with an upstanding cylindrical dowel 70 radially spaced from the pivot post 56. For example, the dowel 70 may be secured to the disc plate 20 by an inverted machine screw 72. As shown in FIG. 5a, the dowel 70 projects upwardly through the cover plate 50 which is provided with a segmented arcuate slot 74 receiving the dowel 70. The dowel 70 additionally is received in one end portion of a generally elongated lever arm 76 mounted on the cover plate 50. More particularly, the lever arm 76 is provided with a generally elliptical aperture 78 which receives the dowel 70 therein. The lever arm is rotatably mounted on a reduced diameter pivot pin 80, shown particularly in FIGS. 2 and 5a. The pin is provided with an enlarged semicircular head and is fixedly secured to the cover plate by an inverted machine screw 82. The lever arm 76 further includes a generally circular, laterally extending flange 84 which overlies, and thereby provides a cover plate for, the segmented arcuate slot 74 in the cover plate 50.

With reference to FIGS. 1 and 2, the lever arm 76 is provided with a remaining end portion 86 which is generally widened in configuration with respect to the remainder of the lever arm 76 and is provided thereon with a pair of upstanding mounted generally rectangular flanges 88. Portions of the flanges 88 extend beyond the end portion 86 and are disposed in adjacent spaced relationship. Partially between the spaced portions of the flanges 88 is an elongated pivot arm 90. As shown in FIGS. 1 and 2, the pivot arm 90 extends along the longitudinal axis of the lever arm 76 and has a horizontally disposed cylindrical end portion 92 mounted for rotation upon a pin 94, extending along the major axis of the cylindrical portion 92. The pin 94 is supported at each of its ends by a respective flange 88 and is maintained in spaced relationship with respect to the cover plate 50. The cylindrical portion 92 is further provided with a lip 96 which overlies in spaced relationship the end portion 86 of the lever arm 76. The lip 96 includes an inverted inclined bearing surface 98 for a purpose to be described. The end portion of the pivot arm 90 opposite from the cylindrical end portion 92 is configured in a generally inverted cup 100 which terminates in a generally flat end 102 defining overhanging gripping portions 104 which, as shown particularly in FIG. 1, partially overhangs a corner of the polyhedron configured cover plate 50 to facilitate manual gripping of the cup shaped portion 100 for a purpose to be described. For example, the entire cup shaped portion 100 is additionally knurled to facilitate manual gripping by a user of the device according to the invention. The cup portion 100 is additionally provided with an inverted cylindrical recess 106 overlying a keeper dowel 108, which may advantageously be provided as a reduced diameter extended portion of the proper one of the corner mounted machine screws 51. As more particularly shown in FIG. 2, the cylindrical portion 92 of the pivot arm 90 is provided at one end thereof with a cylindrical recess 110 surrounding a portion of the pivot pin 94. Disposed within the recess 110 is a spirally wrapped spring 112. With reference to FIG. 2, by way of example, the spring 112 is anchored at one end of the cylindrical portion 92 of the pivot arm 90 and is wrapped spirally around the pivot pin 94 in a counterclockwise direction and anchored at its opposite end of the pivot pin 90. The resilient action of the spring 112 thereby biases the pivot arm 92 to overlie in abutting relationship the cover plate 50, with the inverted recess 106 captured over the projecting dowel 108. Accordingly, the spring 112 and the dowel 108 cooperate to maintain the pivot arm 90 in its initial position as shown in FIGS. 1 and 2, thereby preventing inadvertent motion thereof.

With reference to FIG. 1, the cover plate 50 is additionally provided with an upwardly projecting, reduced diameter stop pin 114 normally abutting a lateral portion of the pivot arm 90 in its initial position. As shown in phantom line in FIG. 1, the pivot arm 90, together with the lever arm 76 may be manually pivoted, in a manner to be hereinafter explained, through an arc of approximately 45° to a second position illustrated in phantom line in FIG. 1. In this second position, the pivot arm 90 abuts against a second stop pin 116 projecting upwardly from the cover plate 50.

With reference yet to FIG. 1, the details of one of the male connecting members 12 will now be explained. However, it is understood that such description applies to each of the male connecting members 12 desired to be used. Each of the male connecting members 12 includes a hooked end portion 118 which extends generally laterally perpendicular from an extended, reduced width lug 120. A bearing surface 122 connects the hooked end portion 118 and the extended lug portion 120, and is inclined at an angle of preferably 8 degrees from a line 124 normal to the extended lug portion 120. The preferred 8 degrees incline of the bearing surface 122 has particular significance in operation of the device which will be explained in detail herein below. The hooked portion 118 is further provided with an extended tip portion 126 defined by a pair of diverging inclined bearing surface 128 and 130.

In operation of the preferred embodiment of the invention, reference will now be made to FIGS. 1 and 2. With the lever arm 76 and its associated pivot arm 90 in their initial positions as shown in the FIGS., the rotatable disc plate 54 will be positioned such that the depending teeth 62 thereof will be disposed within a respective bottom plate recess 26. More specifically, with reference to FIG. 5a. each tooth 62 will be disposed within a respective recess 26 adjacent to, and in longitudinal alignment with, an arcuate recess portion 28 communicating with the recess 26. Additionally, each tooth 62 will be in spaced relationship with the inclined end 46 of an associated plunger 38. A user of the device then inserts the extended tip portion 126 of the male connecting member 12, that carries the looped belt portion 20, into the opening 24 defined between the bottom plate sidewalls walls 22. The inclined bearing surface 128 of the male connecting member will impinge on a tooth 62 and the other inclined bearing surface 30 will impinge on a sliding plunger 38 on its inclined end 46 thereof. Accordingly, the inclined surfaces 128 and 130 will serve to guide insertion of the tip portion 126 in the space between the tooth 62 and the plunger 38. Accordingly, with the tip portion 146 aligned between the tooth 62 and the plunger 38 as shown in FIG. 5a, a user of the device will further insert the male connecting member 12 into the female connecting member 10. With reference then to FIG. 5b, such further insertion will cause retraction of the plunger 38, thereby permitting the hooked end portion 118 to slidably traverse over the bearing surface 68 of the tooth 62. More particularly, the inclined surface 130 of the male connecting member will slidably impinge against the inclined surface 146 of the plunger 38 thereby imparting desired retraction of the plunger 38 and compression of its associated coil spring 44. Further, the inclined surface of the plunger provides a camming action to impinge the hooked end portion 118 slidably against the bearing surface 68 of the tooth 62.

With reference to FIG. 5c, further insertion of the male connecting member is continued until the hooked end portion 118 thereof slidably traverses entirely past the bearing surface 68 of the tooth 62. As that time, the compressed coil spring 44 will expand to slidably extend the piston 38 from its retracted position. The inclined bearing surface 46 of the plunger 38 will thus impart a transverse displacement of the hooked end portion 118. With reference to FIG. 5c, such transverse displacement will permit fully extended sliding extension of the plunger 38 by action of the coil spring 44. Thus a combination of the displacement of the hooked end portion 118 and the extension of the plunger 38 will cause sliding disengagement of the inclined plunger end 46 from the diverging bearing surface 130 of the hooked end portion 118. The plunger 38 in its thus extended position will engage laterally against the extended lug portion 120 of the male connecting member 12 to retain the hooked end portion 118 in position partially circumscribing the tooth 62. More specifically, the inclined bearing surface 122 of the hooked end portion will engage against the substantially flat bearing surface 66 of the tooth 62, and the extended lug portion 120 will be engaged on the bearing surface 68 of the tooth. Accordingly, the lug portion 120 will be restrained between the impinging bearing surface 68 and laterally impinging plunger 38. The bearing surface 66 of the tooth will restrain forces transmitted through the looped belt end portions 18 and 20 which tend to separate the male coupling member 12 from the female coupling member 10. Accordingly, the male coupling member 12 is positively locked in engagement with the female coupling member 10. In similar fashion, the remaining opposed pairs of male coupling member 12 are respectively lockingly engaged in the female connecting member 12.

When it is desired to simultaneously uncouple all of the male connecting members 12 from the female coupling member 10, the following operation is required. With reference to FIGS. 1, 2 and 5d, an operator of the embodiment first manually grasps the knurled, inverted cup 100 of the pivot arm 90. . Such manual grasping is facilitated by the flat nose configuration 102 and the overhanging portions 104 provided on the cup portion 100 as described. With reference to FIG. 2, the operator secondly pivots the pivot arm in such a direction so as to lift the cup portion 100 from the keeper dowel 108 provided on the cover plate 50. As shown in FIG. 2, the cup portion 100 is thus lifted to a secondary position as shown in phantom lines. Such lifting operation is positively limited when the inverted inclined bearing surface 98 of the lip portion 96 of the pivot arm becomes positively stopped against the end portion 86 of the lever arm 76. Such stopping action indicates to an operator that sufficient lifting motion has been accomplished to disengage the cup portion 100 from the keeper dowel 108.

A second positive pivotal motion of the pivot arm 90 is required in order to uncouple the coupling members 12. Accordingly, with reference to FIGS. 1, 2 and 5a, such second pivoting motion of the pivot arm 90 takes place about the pivot pin 80. Accordingly, the pivot arm 90 is manually pivoted by an operator of the invention to its secondary position illustrated in FIG. 1 in phantom outline. As shown, such pivoting displacement of the pivot arm 90 takes place through an angle of approximately 45°. The lever arm 76 is thus also pivoted through the same displacement angle causing the captured dowel 70 to be arcuately displaced along the arcuate slot 74 provided in the cover plate 50. The generally elliptical slot 78 provided in the lever arm 76 permits relative motion between the captured dowel 70 and the lever arm, thereby assuring displacement of the dowel 70 within the arcuate path provided by the slot 74. As shown in FIGS. 1 and 5a, the captured dowel 70 thus assumes a secondary position as illustrated in phantom outline. As shown in FIG. 3, since the dowel 70 is fixedly secured on the disc plate 54, the described arcuate displacement of said dowel will impart rotation to the disc plate 54 about its central pivot post 56. Accordingly, with reference to FIGS. 5c and 5d, the planar bearing surface 66 of each tooth 62 will be slidably removed from engagement on the inclined bearing surface 122 of each hooked end portion of the male connecting members 12. The 8° inclination of each bearing surface 122 allows relatively low friction transmitted between it and a slidably removed tooth 62, for example, despite considerable tension forces transmitted between the opposed looped end portions 18 and 20 of the described belt. Accordingly rotation of the disc plate 54 simultaneously slidably removes each of the teeth 62 from a respective hooked end portion of the male connecting members 12. Each tooth 62 is thus arcuately displaced along the longitudinal axis of a respective arcuate recess portion 28. As shown in FIG. 5d, each tooth 62 thus assumes a secondary position entirely within a respective arcuate recess portion 28 thereby permitting disengagement of each male connecting member 12 from a corresponding rectangular recess 26 provided in the base plate 20. With reference to FIG. 1, the provision of the second stop pin 116 on the cover plate 50 provides a stop for secondary pivoting motion of the pivot arm 90. Thus, as the pivot arm 90 is displaced through an angle 45°, it is stopped against the pin 116 to prevent over travel thereof and to further indicate to an operator that sufficient manual pivoting motion has been imparted to the pivot arm 90 to enable simultaneous uncoupling of the male connecting members 12. Additionally, it is observed that the secondary manual pivoting operation of the pivot arm 90 is in a direction orthogonal with respect to the initial lifting operation which frees the inverted cup portion 100 from the keeper dowel 108. Accordingly, a highly desirable two step pivoting operation is required to cause the desired uncoupling. Such two step operation occurring in orthogonal directions prevents accidental uncoupling should the cup portion 100 be inadvertently disengaged from the keeper dowel 108.

In order to manually reset the pivot arm 90 in its initial position, an operator of the invention merely maintains the inverted cup portion 100 thereof in a raised position against the action of the resilient spring 112, and imparts a return pivotal motion of the pivot arm 90 to its initial position as shown in FIG. 1. When the pivot arm 90 reaches its initial position, it will be stopped against the first provided stop pin 114 which gives an indication to the operator that sufficient return pivotal motion has been accomplished. Accordingly, upon release of the cup portion 100 by the operator, the resilient spring 112 will return it from its raised position to a position overlying and engaged upon the keeper dowel 108. The device is thus reset to allow manual coupling of the male connecting members as heretofore described.

Other modifications and preferred embodiments of the invention are probable, for example: the base plate 20 may be provided with rounded corner portions to further reduce discomfort when utilized in close proximity to a body of the user of the invention, any desired number of coupling members may be connected merely by increasing or decreasing the number of cooperating locking structures described and the pivot arm and lever arm may be modified, the sliding plungers 38 may be eliminated, and, in such case, the lug 120 may be constructed to impinge directly on the sidewall 32 of a corresponding recess 26, the disc 54 being subsequently rotated to engage a tooth 62 on the lug 120 in order to retain the lug in engagement on the sidewall 32 of the female coupling member. Accordingly, additional modifications and preferred embodiments of the invention are probable without departing from the scope of the invention as defined by the appended claims wherein:

I claim:

1. A multi point releasable coupling comprising a first female coupling member, said female coupling member having a plurality of individual coupling means, a plurality of male coupling members adapted to be received and releasably locked in position by said individual coupling means, said male coupling members each having a hooked end portion and first and second bearing surface means, both bearing surface means inclined with respect to the direction of forces to be applied to the coupling member, said female coupling member having a plurality of locking recesses therein, each said individual female coupling means including a spring biased plunger having a beveled planar surface adapted to engage the first bearing surface of a male coupling member and retract upon insertion of said male coupling member into said locking recess, each said female coupling means further including a tooth member adapted for movement within said recess, each tooth member having a planar bearing surface adapted to slidingly engage said second bearing surface of a male coupling member in planar contact during the locking and unlocking operation of said male couplng member, said planar bearing surface of said tooth acting to maintain said male coupling member in said recess in conjunction with said plunger, said plunger advancing to lock said male coupling e member when its second bearing surface aligns with the planar bearing surface of said tooth, thus causing the male coupling member to move generally transversely, a rotatable plate in said female coupling member, said teeth depending from said plate in spaced relation to one another, and means to rotate said plate to unlock said male coupling members.

2. A coupling as in claim 1 wherein said plate has a lug projecting therefrom on the side opposite from said teeth, said means adapted to rotate said plate comprising a pivoted lever member, said lever member having a slot in one end in which said stud is received, said lever adapted to be rotated through approximately 45° to unlock said female coupling member.

3. A coupling as in claim 2 wherein a latch member is pivotally attached to said lever for movement orthogonal to the pivotal movement of said lever, a locking projection on said female coupling member whereby said latch member first has to be pivoted before said lever can be rotated.

4. A coupling as in claim 1 and further comprising keeper means to lock said means to rotate said plate against inadvertent displacement.

5. A coupling as in claim 1 wherein there are five individual female coupling means on said female coupling member.

6. A coupling as in claim 1 wherein each second bearing surface of said male coupling members and said planar bearing surface of said tooth are both inclined inwardly at approximately 8° to a line perpendicular to the direction of force applied to the male coupling member when in a locked position.